United States Patent [19]

Uhlin

[11] Patent Number: 5,630,043

[45] Date of Patent: May 13, 1997

[54] ANIMATED TEXTURE MAP APPARATUS AND METHOD FOR 3-D IMAGE DISPLAYS

[75] Inventor: Keith Uhlin, Alamo, Calif.

[73] Assignee: Cirrus Logic, Inc., Fremont, Calif.

[21] Appl. No.: 439,247

[22] Filed: May 11, 1995

[51] Int. Cl.⁶ .................................................. G06F 15/00
[52] U.S. Cl. ......................................................... 395/174
[58] Field of Search ................................. 395/125, 154, 395/120, 141, 159, 173, 174, 175

[56] References Cited

U.S. PATENT DOCUMENTS

| | | | |
|---|---|---|---|
| 4,645,459 | 2/1987 | Graf et al. | 434/43 |
| 5,226,109 | 7/1993 | Dawson et al. | 395/120 |
| 5,327,509 | 7/1994 | Rich | 382/17 |
| 5,369,736 | 11/1994 | Kato et al. | 395/125 |
| 5,404,437 | 4/1995 | Nguyen | 395/152 |
| 5,452,414 | 9/1995 | Rosendahl et al. | 395/159 |
| 5,506,949 | 4/1996 | Perrin | 395/152 |

*Primary Examiner*—Phu K. Nguyen
*Attorney, Agent, or Firm*—Robert Platt Bell & Associates, P.C.

[57] ABSTRACT

A method and apparatus for generating 3-D images utilizes an MPEG decoder to decode/decompress animated texture maps into a half-frame buffer. The MPEG decoder may act as a PCI bus master to assert control of the host system bus to the exclusion of all other system devices to transfer animated texture maps into an off-screen portion of video memory. A graphics subsystem generates a 3-D image from 3-D image data stored in display memory portion of video memory and superimposes the 3-D image with texture map data from the off-screen portion of video memory. Texture map data may be continually updated by MPEG decoder 360 on a periodic basis without interfering with the operation of the graphics subsystem. The resultant 3-D image with animated texture maps may provide a more realistic display, particularly for animated objects, such as a human face.

20 Claims, 4 Drawing Sheets

ANIMATED TEXTURE MAP APPARATUS AND METHOD FOR 3-D IMAGE DISPLAYS

FIELD OF THE INVENTION

This invention relates generally to the field of video displays, particularly for displaying three-dimensional video images.

BACKGROUND OF THE INVENTION

Three-dimensional or 3-D video images have been used extensively for various computer applications such as modeling, CAD/CAM systems, simulations (e.g., flight simulation), so-called virtual reality displays, and computer games. A 3-D video image is defined for the purposes of this application as a display representing an object in three dimensions, generally rendered on a two-dimensional display (e.g., CRT or the like) using techniques of perspective to make an object appear in three dimensions. Other types of displays may be utilized to display a 3-D image, such as stereo-optical goggles typically associated with so-called virtual reality displays. Moreover, other types of displays may be provided in the future (e.g., holographic 3-D image projectors) to make a 3-D image appear in space.

A user may alter his perspective or vantage point of an object in a 3-D image and view a 3-D object from another angle. A host computer may then redraw the object as seen from that angle. Such a technique may allow a user to view objects in so-called virtual space from many different angles. For example, for architectural modeling, a viewer may be able to "walk" through a virtual building designed on a computer to view how the interior and exterior may look when constructed.

Such 3-D images may require considerable computing power to generate. In general, the more detailed a 3-D image, the more computing power may be required. Thus, early 3-D image displays were limited to simple line figure or box constructions and may have provided a jerky image motion when perspective is changed by a viewer. Such displays may provide only a limited sensation of realism and thus may be inadequate for simulation of three dimensional objects.

FIG. 1 illustrates a simple line FIG. 3-D image of a wall. The shape and size of the wall may be defined within a computer system as a series of coordinate points (x,y,z) in three dimensional space. A 3-D image of such a wall may be generated from these coordinates and a viewer perspective or position value to generate a 3-D image, such as shown in FIG. 1. As the viewer's perspective is altered, the image may be appropriately redrawn to preserve perspective and give the illusion of movement of the viewer within the field of the image.

The 3-D image of FIG. 1, however, is rather primitive and may not provide a desired level of realism. One approach to improving the realism of such 3-D images is to provide a two dimensional texture map which may be superimposed over a 3-D image to enhance the appearance of realism of the 3-D image. For a given surface of a 3-D image, a two dimensional texture map may be stored as a bitmap in computer memory. When a 3-D image is displayed, three dimensional object data may be used to generate the overall shape of an object as viewed from a particular angle, while the two-dimensional texture map may be use to color the surfaces of the image to enhance realism.

FIGS. 2A and 2B illustrate an example of the use of such texture maps. FIG. 2A illustrates a texture map, which, as an example, is a brick pattern. In this example, the texture map of FIG. 2A is a repetitive pattern and thus only a portion of the overall pattern need be stored as a texture map. Other texture map patterns may not be repetitive, and thus may require storage of an image large enough to cover an entire surface or portion of a 3-D object. FIG. 2B illustrates the texture map of FIG. 2A as applied to the 3-D image or object of FIG. 1. When superimposed with the texture map of FIG. 2A, the 3-D image of FIG. 1 may appear more realistic as a 3-D image on a video display.

FIG. 4 illustrates an apparatus for generating such a 3-D image on a video display. The system of FIG. 4 includes a host CPU 410 (e.g., 486 type processor, Intel™ Pentium™ processor, Motorola™ 68000 processor, IBM™ PowerPC™ or the like) coupled to a system bus 430 (e.g., ISA, EISA, PCI bus or the like). Host processor 410 may process data received over system bus 430 in accordance with an applications program (e.g., video game, virtual reality program, CAD system, simulator, modeling software or the like). Host processor may receive as an input a viewer command which may be translated into a viewer position or perspective for use in generating a 3-D image corresponding to such perspective.

Also coupled to system bus 430 is a graphics subsystem 420 which may comprise all or a portion of a video controller circuit. Coupled to graphics subsystem 420 is a video memory 440 comprising display memory portion 441 and off-screen memory portion 442. Display memory portion 441 may include image data 443 for storing 3-D image data. Off-screen memory portion 442 may include texture map 444 for superimposing over a 3-D image.

Video display 450 may be coupled to graphics subsystem 420 to display 3-D images. Video display 450 may comprise a CRT, flat panel display, television, or the like. In operation, the system of FIG. 4 may retrieve raw 3-D image data and texture maps from a data source (not shown) such as a hard drive, floppy disk, CD-ROM, flash memory, network, or the like, as is known in the art.

Such raw 3-D image data may be processed by host CPU 410 and stored as 3-D image data 443 in display memory portion 441. In particular, host CPU 410 may process raw 3-D image data to generate a correct perspective 3-D image for a given viewer perspective. Texture map 444 may be processed by graphics subsystem 420 to be superimposed over a 3-D image in correct perspective.

Such an apparatus and technique may be suitable for enhancing the display of inanimate (i.e., unchanging) objects. However, many surfaces in a 3-D display may change over time. In particular, a display of an animate object (e.g., human face) may change with time. A 3-D image generated using a 3-D object superimposed with a texture map may not provide a convincing 3-D image. Moreover, in any 3-D image display, a considerable amount of computing power may be required to generate a convincing realistic display, particularly if considerable detail or motion is provided.

SUMMARY AND OBJECTS OF THE INVENTION

An apparatus for generating a 3-D image, includes a system bus for transferring data and a graphics subsystem for receiving 3-D image data and animated texture data and combining and processing the received 3-D image data and animated texture data to output processed 3-D image data. A video memory includes a display memory portion which stores 3-D image data and an off-screen memory portion which stores animated texture data received from the system bus through the graphics subsystem. The video memory supplies the graphics subsystem 3-D image data and animated texture data for combining and processing into processed 3-D image data. A video display receives the processed 3-D image data and displays a 3-D image.

A host processor, coupled to the system bus, processes data received from the system bus and outputs 3-D image data to the system bus for storage in the display memory portion of the video memory. A video source may provide encoded animated texture data. A video decoder receives and decodes the encoded animated texture data to produce decoded animated texture data which may be temporarily stored in a frame buffer coupled to the video decoder.

The video decoder may control the system bus to the exclusion of other devices to transfer decoded animated texture data from the frame buffer to the off-screen memory portion of the video memory.

It is an object of the present invention to provide a realistic 3-D image for a video display.

It is a further object of the present invention to provide a realistic 3-D image for a video display without significantly increasing processing power requirements.

It is a further object of the present invention to provide a 3-D image for a video display having animated texture maps.

It is a further object of the present invention to provide a 3-D image for a video display having animated texture maps using prior art graphics subsystems.

BRIEF DESCRIPTIONS OF THE DRAWINGS

DETAILED DESCRIPTION OF THE INVENTION

Figure 1:
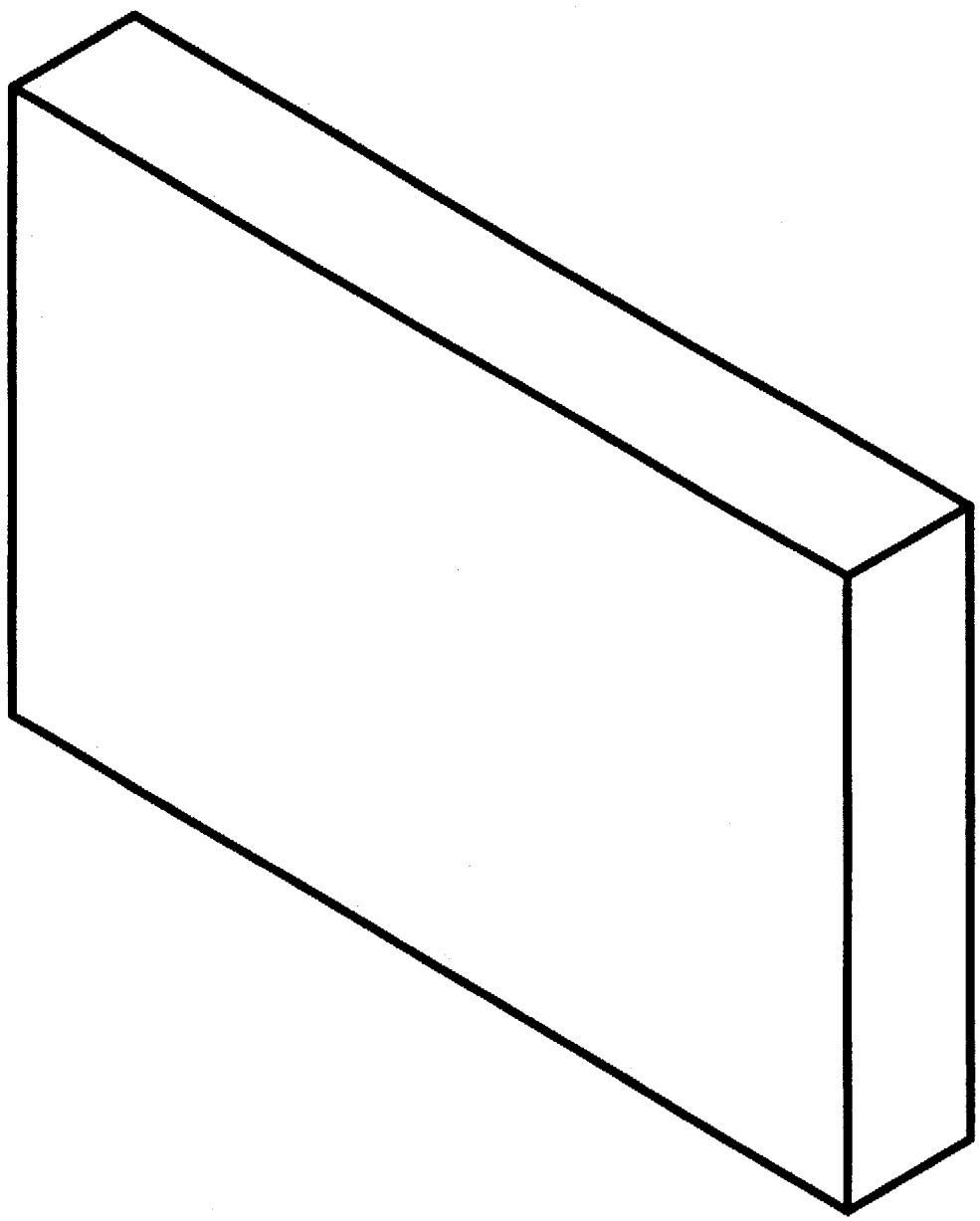
FIG. 1 illustrates a simple line FIG. 3-D image of a wall.
Figure 2B:
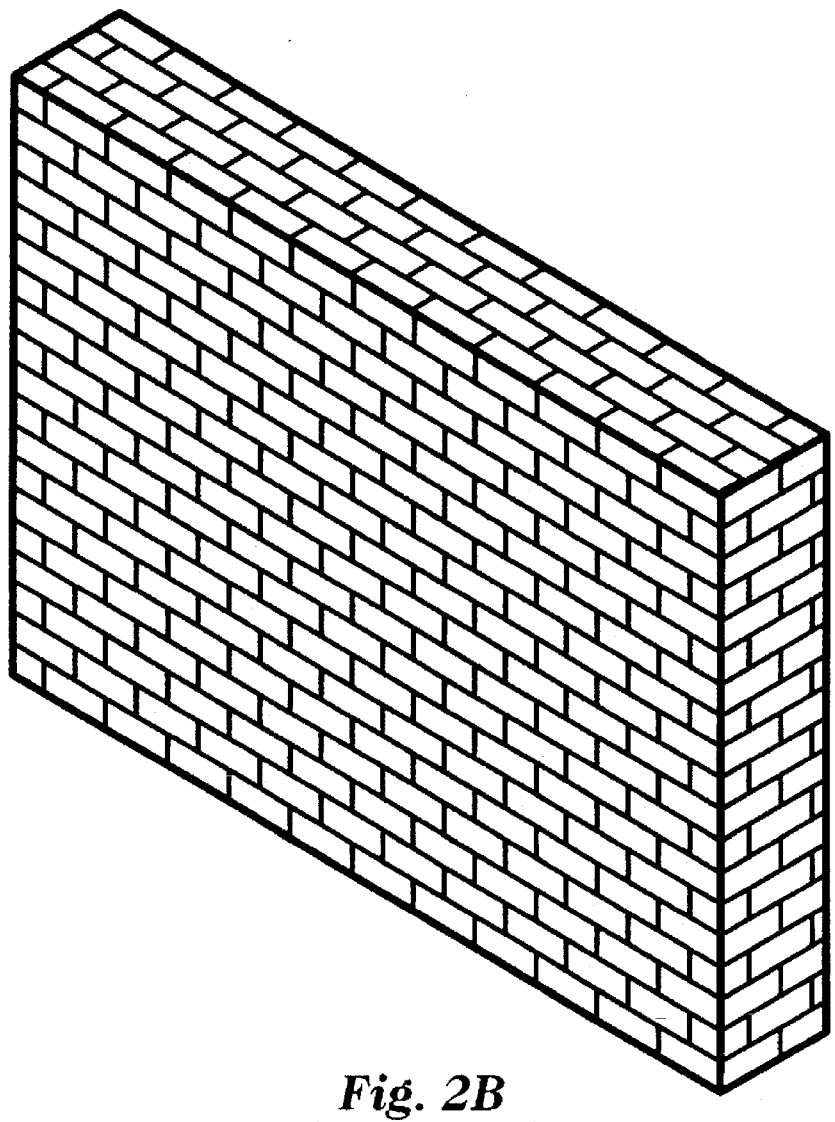
FIG. 2B illustrates the texture map of FIG. 2A as applied to the 3-D image or object of FIG. 1.
Figure 2A:
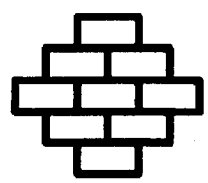
FIG. 2A illustrates a texture map, which, as an example, is a brick pattern.
Figure 3:
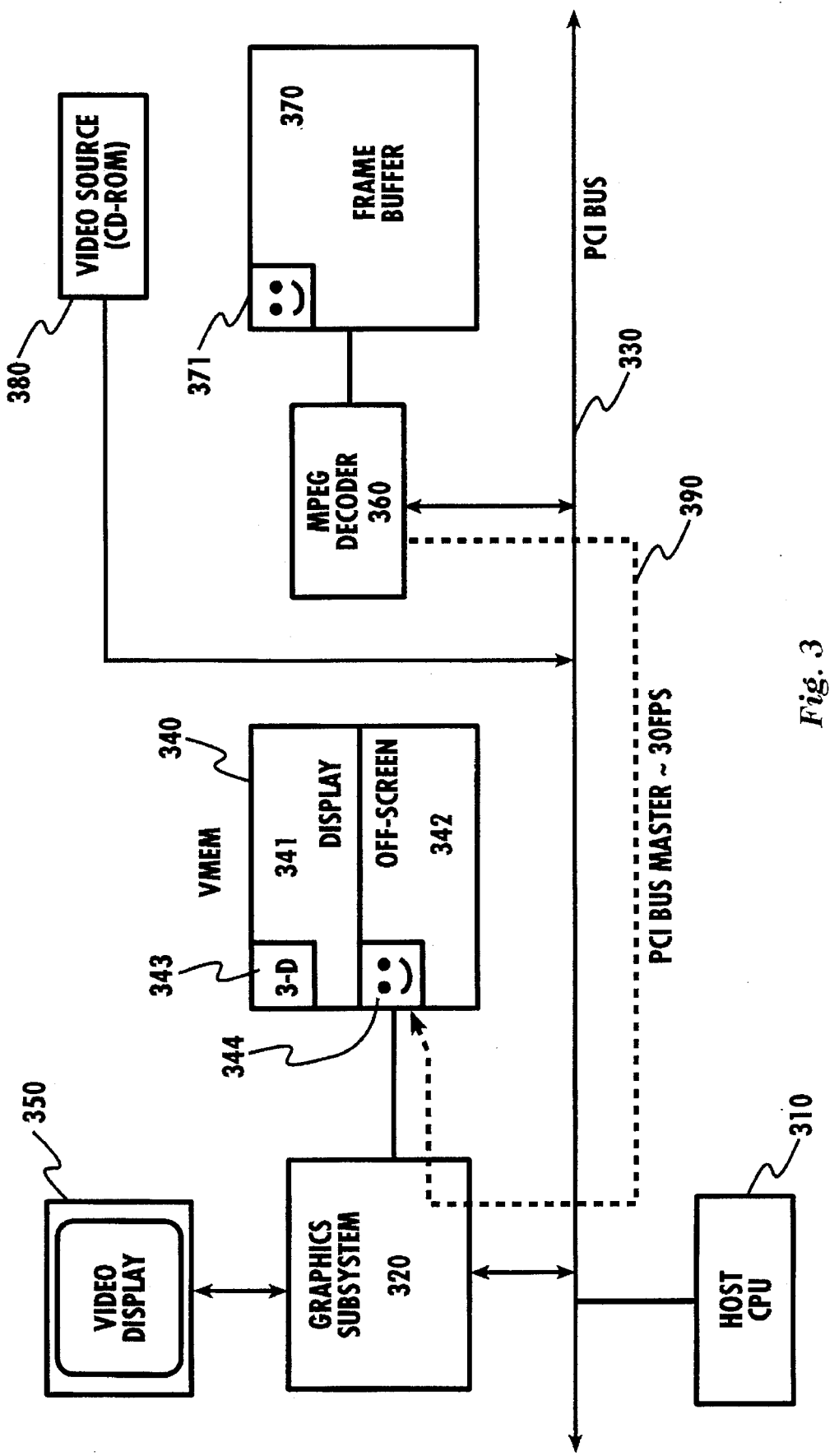
FIG. 3 is a block diagram illustrating the apparatus of the present invention for generating a 3-D image on a video display using animated texture maps.
Figure 4:
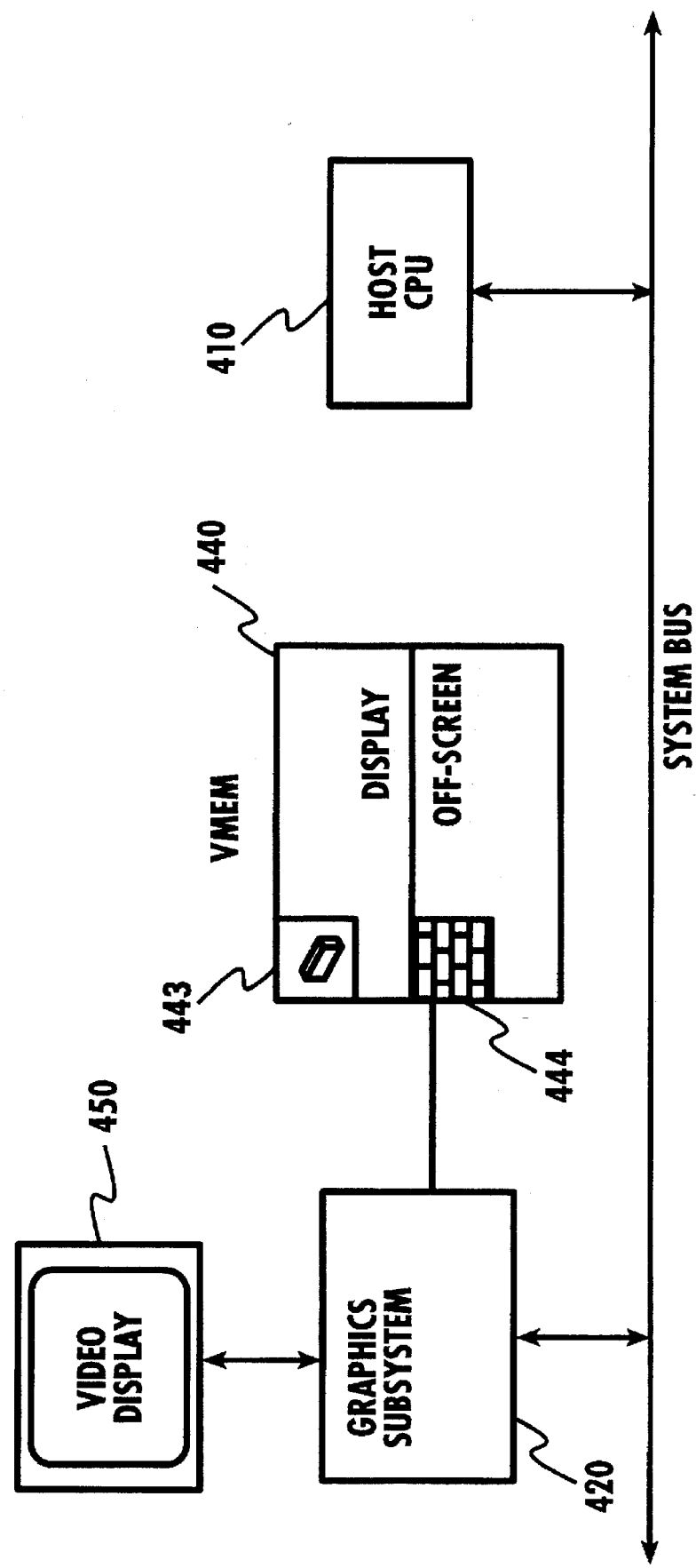
FIG. 4 is a block diagram illustrating a prior art apparatus for generating a 3-D image on a video display.

FIG. 3 is a block diagram illustrating the apparatus of the present invention for generating a 3-D image on a video display using animated texture maps. The apparatus of FIG. 3 operates in a similar manner to that of prior art FIG. 4. However, the apparatus of FIG. 3 incorporates an MPEG decoder 360 operable as a bus master on PCI system bus 330.

MPEG decoder 360 may receive video data from a video source 380 (e.g., CD-ROM or the like) which may be compressed in one of a number of known formats such as MPEG I, MPEG II or the like. While illustrated here as an MPEG decoder, MPEG decoder 360 may be substituted with another type of bus-mastering decoder without departing from the spirit and scope of the invention.

MPEG decoder 360 is a bus-mastering decoder for a PCI system bus 330. In other words, MPEG Decoder 360 may take control of PCI system bus 330 to the exclusion of all other devices, including host CPU 310. Data from video source 380 may be transferred over PCI system bus 330 and stored in frame buffer 370. Such data may include, for example, a frame of an animated texture map 371. An animated texture map may comprise a series of frames of video data intended for use as a texture map for a 3-D image. In the illustrated example, animated texture map 371 may comprise a texture map of a human face.

MPEG DECODER 360 may then transfer animated texture map data 371 over PCI system bus 330 to off-screen memory portion 342 of video memory 340 using PCI bus mastering techniques, as illustrated by dashed line 390. The use of PCI bus mastering techniques allows for sufficient data bandwidth to transfer animated texture maps at a frame rate of approximately 30 frames per second (FPS), sufficient to provide an appearance of realistic animation. Note that animated texture map data may not be passed through host CPU 310, and thus the operation of host CPU is not substantially affected.

The operation of graphics subsystem 320 is not substantially affected by the use of animated texture maps in the present invention. Graphics subsystem 320 generates 3-D images on video display 350 in a similar manner as the system of FIG. 4. 3-D image data 343 is retrieved from display memory portion 340, superimposed with texture map 344 from off-screen memory portion 342 of video memory 340 and displayed on video display 350. Video display 350 may be refreshed periodically by graphics subsystem 320 which may continually redraw and texture the 3-D image.

The actual contents of texture map 344 in off-screen memory portion 342 of video memory 340 are of no consequence to graphics subsystem 320. Rather, graphics subsystem 320 merely retrieves whatever texture map data is indicated at a particular address in off-screen memory and uses such data to superimpose over a 3-D image. Thus, the apparatus of the present invention may be utilized without the need to substantially alter the design of graphics subsystem 320 over prior art graphics subsystem 420. Indeed, it may be feasible to utilize the prior art graphics subsystem 420 of FIG. 4 in place of graphics subsystem of FIG. 3.

In operation, an animated texture map may be loaded, in compressed from, from video source 380 (e.g., CD-ROM). As an example, such an animated texture map may comprise one or more texture maps representing a human face or portions thereof. Such texture maps may each correspond to portions of a human face as divided into a series of polygons in a 3-D image. Each texture map representing a portion of a human face may be suitably animated to illustrate the changes in that portion, for example, while the human face is talking.

MPEG decoder 360 decodes and/or decompresses animated texture map data and may store it in frame buffer 370 as decompressed texture map data 371. Frame buffer 370 is illustrated as a buffer having sufficient size to store one of a frame of video data, however, other sized buffers may be utilized without departing from the spirit and scope of the invention.

Frame buffer 370 may be provided with buffer empty and full flags, as is known in the art, to regulate the flow of data through frame buffer 370. Periodically, MPEG decoder 360 may assert control of PCI system bus 330 as PCI bus master and transfer animated bit map data from frame buffer 370 to off-screen memory portion 342 of video memory 340. Animated bit map data may be transferred though PCI system bus 330 at an average rate of approximately 30 frames per second in order to provide an appearance of animation.

Graphics subsystem 320 creates a 3-D image on display 350 from 3-D image data stored in display memory portion 341. In the example provided, the 3-D image comprises a human face. A human face generally comprises a number of compound-curved surfaces which may be difficult to render in a 3-D image. In order to reduce required computing power, such an image may be reduced to a number of polygon surfaces, each provided with a corresponding animated bit map.

Graphics subsystem 320 renders each polygon surface on video display 350 corrected according to the perspective of the viewer. The perspective of the viewer may be input according to a program run on host CPU 310 which may receive and translate such information as input from a viewer joystick (not shown) used to manipulate "position" of the viewer, for example, as in a video game.

Host CPU 310 may process 3-D image data received over PCI system bus 330 from a data source (e.g., hard drive, floppy disk, network, memory, or the like) and output to display memory portion 341 of video memory 340 3-D image data 343 corresponding to an input viewer perspective. Such 3-D image data may be generated, for example, in conjunction with computer software (e.g., video game, virtual reality program, simulator, CAD system, modeling software or the like).

Each polygon surface is then superimposed with its corresponding texture map 344 (typically a bit map image) from off-screen memory portion 342 of video memory 340. As each bit map is updated at a rate of approximately 30 frames per second, the textures of 3-D image on video display 350 may change over time. Thus, facial movements of a 3-D image may be generated not only by altering the shapes of the polygons in 3-D image data, but also be altering its corresponding texture map. In addition, a viewer may alter his perspective during facial movement of the 3-D image and preserve the appearance of realism.

The use of PCI bus mastering allows sufficient data bandwidth to update texture maps at a sufficient data rate to provide an appearance of animation. A more traditional technique of passing texture map data through a host processor may not have sufficient data bandwidth to provide realistic animation without unduly slowing down the system or requiring a higher power processor. In addition, the use of the MPEG decoder and PCI bus mastering to generate animated texture maps may allow for the use of prior art graphics subsystems without modification and thus provide improved 3-D imaging on existing hardware or without substantial additional cost.

Although illustrated herein as being applied to generating a human facial 3-D image, the apparatus and method of the present invention may be utilized to generate other types of 3-D images where texture animation may be desired. For example, human or animal figures, moving objects, and the like may be more realistically rendered using the apparatus of the present invention. In addition, the texture map animation of the present invention may be utilized to more accurately represent changes in lighting conditions on both static and dynamic objects. Moreover, the apparatus and method of the present invention may also be utilized to generate static (non-animated) texture maps for 3-D images in which animation is not required or desired.

While the preferred embodiment and various alternative embodiments of the invention have been disclosed and described in detail herein, it may be obvious to those skilled in the art that various changes in form and detail may be made therein without departing from the spirit and scope thereof.

What is claimed is:

1. An apparatus for generating a 3-D image, comprising: a system bus, for transferring data;
    a video decoder, coupled to said system bus, for receiving and decoding encoded animated texture data to produce decoded animated texture data; and
    a graphics subsystem, coupled to said system bus, for receiving 3-D image data and decoded animated texture data and combining and processing said received 3-D image data and decoded animated texture data to output processed 3-D image data,
    wherein said video decoder may control said system bus to the exclusion of other devices to transfer the decoded animated texture data to said graphics subsystem at texture data frame rates sufficient to provide a realistic animation.

2. The apparatus of claim 1, further comprising:
    a video memory, coupled to said graphics subsystem, comprising a display memory portion for storing 3-D image data and an off-screen memory portion for storing decoded animated texture data received from said system bus through said graphics subsystem and for supplying to said graphics subsystem 3-D image data and decoded animated texture data for combining and processing into processed 3-D image data.

3. The apparatus of claim 2, further comprising:
    a frame buffer, coupled to said video decoder, for temporarily storing decoded animated texture data.

4. The apparatus of claim 3, further comprising:
    a host processor, coupled to said system bus, for processing data received from said system bus and for outputting 3-D image data to said system bus for storage in said display memory portion of said video memory.

5. The apparatus of claim 4, further comprising:
    a video source, coupled to said system bus for providing encoded animated texture data to said system bus for transfer to said video decoder.

6. The apparatus of claim 5, further comprising:
    a video display, coupled to said graphics subsystem, for receiving said processed 3-D image data and displaying a 3-D image.

7. The apparatus of claim 6, wherein said system bus comprises a PCI system bus.

8. The apparatus of claim 7 wherein said video decoder asserts control of said PCI system bus as PCI bus master to control said PCI system bus to the exclusion of all other devices on said PCI system bus to transfer decoded animated texture data over said PCI system bus to said off-screen memory portion of said video memory through said graphics subsystem.

9. The apparatus of claim 8, wherein said video decoder comprises an MPEG video decoder.

10. The apparatus of claim 9 wherein said video source comprises a CD-ROM drive.

11. A method for generating a 3-D image, comprising the steps of:
    receiving and decoding in a video decoder, encoded animated texture data to produce decoded animated texture data,
    asserting control of a system bus coupled to the video decoder, to the exclusion of other devices on the system bus,
    transferring the decoded animated texture data over the system bus to a graphics subsystem, and
    receiving 3-D image data and decoded animated texture data in a graphics subsystem and combining and processing said received 3-D image data and decoded animated texture data to output processed 3-D image data.

12. The method of claim 11, further comprising the steps of:

storing 3-D image data in a display portion of a video memory coupled to the graphics subsystem, and storing decoded animated texture data in an off-screen memory portion of the video memory, and supplying to the graphics subsystem 3-D image data and decoded animated texture data for combining and processing into processed 3-D image data.

13. The method of claim 12, further comprising the step of:

temporarily storing decoded animated texture data in a frame buffer coupled to the video decoder.

14. The method of claim 13, further comprising the steps of:

processing data received from the system bus in a host processor coupled to the system bus, and outputting 3-D image data from the host processor to said system bus for storage in said display memory portion of said video memory.

15. The method of claim 14, further comprising the steps of:

a video source, coupled to said system bus for providing encoded animated texture data to said system bus for transfer to said video decoder.

16. The method of claim 15, further comprising the steps of:

a video display, coupled to said graphics subsystem, for receiving said processed 3-D image data and displaying a 3-D image.

17. The method of claim 16, wherein said system bus comprises a PCI system bus.

18. The method of claim 17 wherein said video decoder asserts control of said PCI system bus as PCI bus master to control said PCI system bus to the exclusion of all other devices on said PCI system bus to transfer decoded animated texture data over said PCI system bus to said off-screen memory portion of said video memory through said graphics subsystem.

19. The method of claim 18, wherein said video decoder comprises an MPEG video decoder.

20. The method of claim 19 wherein said video source comprises a CD-ROM drive.

* * * * *